United States Patent [19]
Muller

[11] 3,863,999
[45] Feb. 4, 1975

[54] DETACHABLE WARNING LIGHT

[76] Inventor: Philip O. Muller, 13005 James Ave., South, Burnsville, Minn. 55337

[22] Filed: Dec. 26, 1973

[21] Appl. No.: 427,820

[52] U.S. Cl.............. 339/10, 70/167, 240/57, 292/162, 339/82
[51] Int. Cl............................................. H01r 13/54
[58] Field of Search............. 339/10, 39, 75–79, 339/82, 91, 94, 130, 125, 129; 70/167; 292/162, 259, 302; 240/7.1 R, 8.18, 52.1, 57

[56] References Cited
UNITED STATES PATENTS

| | | | |
|---|---|---|---|
| 2,996,607 | 8/1961 | Mitt | 240/52.1 |
| 3,020,509 | 2/1962 | Whelen | 339/91 R |
| 3,425,025 | 1/1969 | Williams | 339/75 M |

Primary Examiner—Joseph H. McGlynn

[57] ABSTRACT

An apparatus for removably attaching an audible or visual alarm device to a vehicle surface is described, the apparatus having an insulated post with an internal electrical conductor attached to the surface, and an alarm device mounting base seated over the post with a slidable wedge block clamping the mounting base against the surface, and a quick-disconnect electrical contact connecting the post internal conductor to the alarm device.

10 Claims, 2 Drawing Figures

PATENTED FEB 4 1975

3,863,999

DETACHABLE WARNING LIGHT

This invention relates generally to an apparatus for detachably connecting lights and other electrical appliances to a surface; and particularly, to an apparatus for detachably connecting an alarm beacon to the roof or other surface of an emergency vehicle. The invention enables such a light to be securely fastened to its mounting surface, but also to be removably attached so that it may be quickly removed for repair or replacement.

Emergency vehicles such as police cars usually have a rotating beacon mounted to their roof for providing a visual warning whenever the vehicle is on an emergency run. This beacon flashes or rotates a light beam over the area immediately surrounding the vehicle to give notice of the vehicle's approach. Together with a siren or other audible warning device, the visual warning device provides the only alarm indication available to the emergency vehicle to enable it to make emergency runs safely. The rotating beacon alarm signal is an essential element in allowing the emergency vehicle to perform its functions, particularly at night. Accordingly, whenever the alarm beacon becomes disabled through malfunction or damage the entire emergency vehicle must be removed from its ordinary duties while the beacon is being repaired or replaced. Since the emergency vehicle represents a considerable investment in terms of equipment, and since its inactive service status curtails the effectiveness of the emergency function generally, it is of crucial importance to be able to quickly repair or replace any defective alarm beacon.

The present invention accomplishes this result by means of a beacon mounting base which is removably attached to the vehicle roof and on which is attached the warning beacon. In the event of a beacon malfunction the entire invention and warning beacon may be quickly removed from the emergency vehicle, and another installed. This operation requires no wiring hookups or mechanical connectors other than a simple novel sliding lock which serves to disconnect the entire inventive apparatus from the surface of the vehicle.

It is therefore an object of this invention to provide an apparatus for enabling the quick replacement of emergency alarm beacons from vehicles;

It is another object of this invention to provide a beacon mounting or removal apparatus which requires a minimum of electrical or mechanical connections;

It is a further object of this invention to provide a removable beacon mounting base which may be secured and locked while in use. These and other objects will become apparent from a reading of the specification and claims, with reference to the drawings, in which:

Briefly, the invention comprises an insulated post having an upper shoulder and a bottom threaded portion which is secured to a vehicle surface; a mounting base which has a center hole large enough to fit over the post shoulder; a sliding wedge plate which bears between the mounting base and the post shoulder; and an electrical connecting apparatus for contacting the electrical alarm beacon connection, said electrical connecting apparatus being mounted in the insulated post and wired to the vehicle power source. The alarm beacon is typically attached to the mounting base by means of bolts or other fasteners. A locking device is provided in cooperation with the sliding wedge plate to restrict the wedge plate in a locked position when the apparatus is ready for use with an alarm beacon. Removal of the alarm beacon and the apparatus from the vehicle roof of surface is easily accomplished by merely unlocking the locking device and sliding the wedge plate away from contact with the post shoulder. This enables the apparatus to be lifted away from contact with the vehicle surface and also disconnects the electrical circuits from the vehicle power source.

Figure 1:
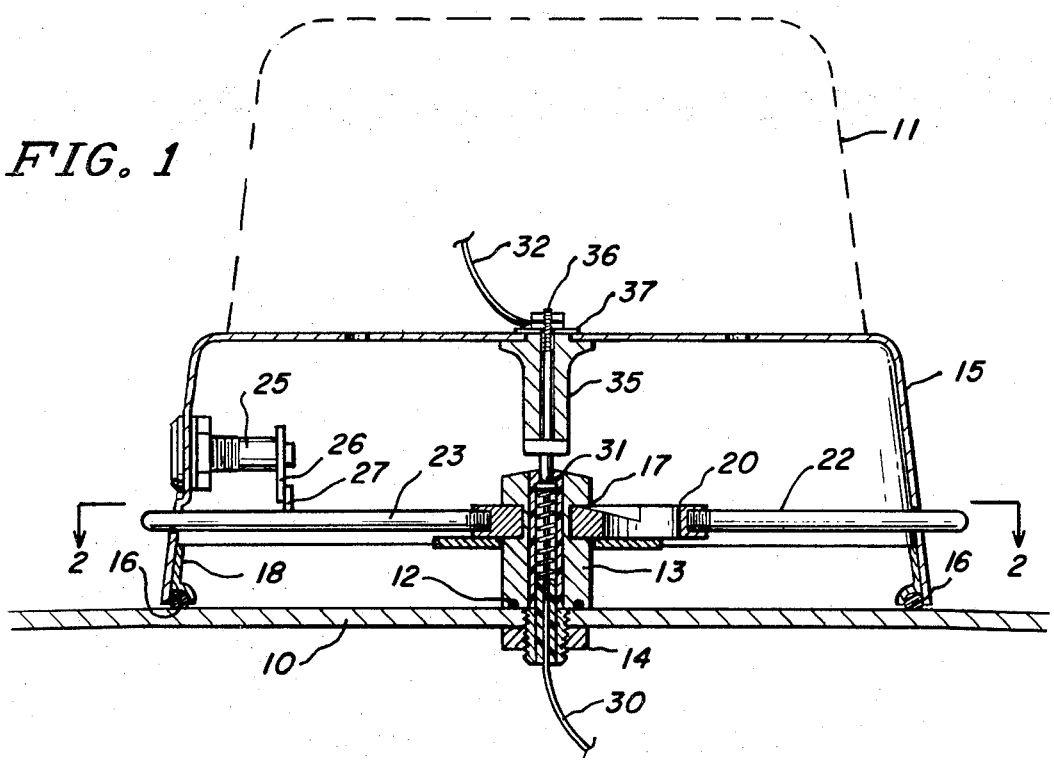
FIG. 1 illustrates in side view the invention with a beacon attached thereto.

FIG. 1 illustrates in partial cross section and side view the invention mounted on a surface 10. Surface 10 is typically an emergency vehicle body portion. An alarm beacon 11 is shown in dotted outline form. This alarm beacon is typically a motor-driven high intensity light which generates a rotating beam over a wide surrounding area. Alarm beacon 11 is driven by means of the vehicle power source which is connected thereto in the manner to be described hereafter. Alternatively, alarm beacon 11 could as well be an audible alarm device such as a vehicle siren.

Alarm beacon 11 is mounted by means of bolts or other fasteners to a mounting base 15, which has an inverted dish shape and extends between alarm beacon 11 and mounting surface 10. A gasket 16 extends around the bottom periphery of mounting base 15, and serves to create a water tight connection between mounting base 15 and surface 10.

A post 13, made of plastic or other insulating material, is secured to surface 10 by means of a threaded shank and nut 14; both the nut 14 and the shank of post 13 are made of insulating material. A round gasket 12 fits adjacent the surface 10 and within a groove in post 13 to maintain a water tight connection at the point where post 13 protrudes through mounting surface 10. Post 13 has a circumferential groove cut out near its top to form a shoulder 17. Shoulder 17 receives a sliding wedge block 20 which will be hereafter described. An interior plate 18 is attached to mounting base 15 by means of welds or other attachment. Interior plate 18 has a central hole sized slightly larger than the exterior diameter of post 13 to enable plate 18 to fit over post 13.

The wedge plate 20 slides over the surface of plate 18 and under shoulder 17 to form a locking clamp for securely attaching mounting base 15 to post 13. Wedge plate 20 has a first threaded shaft 22 and a second threaded shaft 23 screwed into either of its ends; shafts 22 and 23 extend to the exterior of mounting base 15 and may be moved either to the right or to the left to attach and remove mounting base 15 from surface 10.

Figure 2:
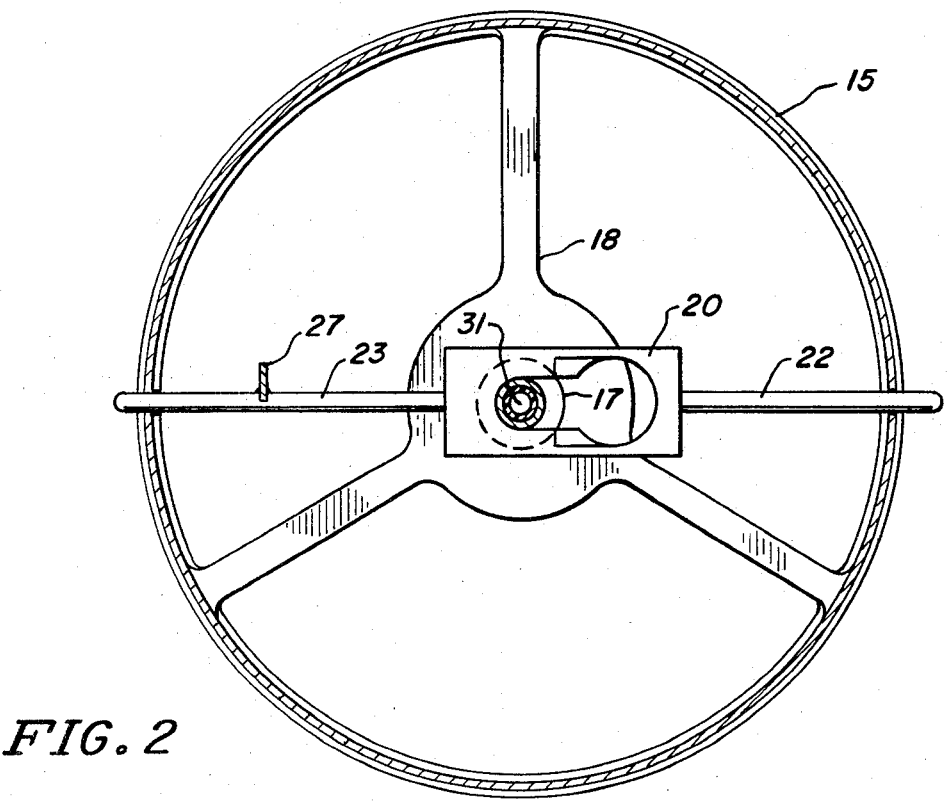
FIG. 2 illustrates a view of the invention taken along the lines 2—2 in FIG. 1.

FIG. 2 illustrates a cross sectional view taken along the lines 2—2 in FIG. 1. Wedge plate 20 is illustrated in a locked position, with its smaller diameter opening positioned beneath shoulder 17. To unlock wedge plate 20, shafts 22 and 23 must be moved to the left, thereby sliding wedge plate 20 to the left and bringing the downward wedge incline beneath shoulder 17. This loosens the wedge plate clamp against shoulder 17, and further, moves the large diameter hole on the right side of wedge plate 20 into alignment with post 13. This large diameter hole is larger than the exterior diameter of post 13, and therefore there is created a clearance between post 13 and wedge plate 20. In its left-most position, wedge plate 20 and mounting base 15 may be lifted over post 13 and removed from the surface 10.

Shafts 22 and 23 slide through exterior holes in mounting base 15. Wedge plate 20 slides across the upper surface of interior plate 18. When wedge plate 20 is in its locked position the interior plate 18 is securely held down by means of the wedging force of wedge plate 20 against shoulder 17. Since interior plate 18 is fastened to the interior surface of mounting base 15 the locked position of wedge plate 20 also serves to hold mounting base 15 against surface 10. In actual practice, the downward locking force is sufficient to slightly deform gasket 16 and thereby form a very tight water proof seal around the perimeter of mounting base 15.

Once the wedge plate 20 has been moved to its right most locked position it may be secured in that position by means of key latch 25. Key latch 25 may be operated with a key to rotate arm 26 to come into sliding contact with latch 27. Latch 27 is secured to shaft 23 at an appropriate position, and serves to prevent shaft 23 from moving leftward. Key latch 25 may be any of a number of well known key operated latches available for this purpose.

The electrical connection to alarm beacon 11 is made through wire 30, which is connected to the vehicle power source (not shown). Wire 30 is electrically connected to a spring-biased contact plate 31 which is recessed within post 13. Contact plate 31 may be moved downwardly against the spring force, but is prevented from full upward movement by means of an internal raised shoulder in post 13. The upper interior surface of mounting base 15 has an insulated post 35 attached thereto. Post 35 is fastened to mounting base 15 by means of conductive threaded bolt 36. An insulating washer 37 electrically isolates the bolt 36 and its fastening nut from contact with mounting base 15. Wire 32 is attached to bolt 36 by means of suitable fasteners. Wire 32 connects to a suitable electrical connection on alarm beacon 11. For example, if alarm beacon 11 is a rotating light, wire 32 would be connected to drive the rotating motor and energize the light. The bottom portion of conductive bolt 36 comprises a rounded male contact which is sized to fit within the hole in post 13 against contact plate 31; therefore, when mounting base 15 is properly secured against surface 10 the male end of conductive bolt 36 makes electrical contact with contact plate 31. Likewise, when mounting base 15 is removed from locking relationship against surface 10, the male contact of bolt 36 moves from electrical contact with contact plate 31, disconnecting the power to the alarm beacon.

The foregoing is a description of the preferred embodiment of my invention, which embodiment may be varied in some particulars without departing from the spirit of the invention. For example, the electrical connections may be varied somewhat, so long as the principal purpose of obtaining a quick and convenient electrical circuit to the alarm beacon is met. Also, the shoulder 17 could equally well be formed on post 13 by constructing a portion of post 13 to be of larger diameter than the post, than by constructing the circumferential groove described herein.

I claim:

1. Apparatus for attaching an electrical appliance to a surface for subsequent convenient removal, comprising:
    A. an insulated post attached to said surface and having an internal axially aligned electrical conductor and a shoulder;
    B. an appliance mounting base having a mounting hole sized larger than said post and fitting over said post, said mounting base having a bearing surface extending near said shoulder;
    C. a slidable wedge block movable on said bearing surface and having a wedge incline for contacting said shoulder for transmitting a locking force from said shoulder to said bearing surface;
    D. a quick-disconnect electrical coupling attached to said mounting base at a position to contact said post internal electrical conductor when said mounting base is positioned over said insulated post.

2. Apparatus as claimed in claim 1 further comprising at least one arm attached to said slidable wedge block and extending therefrom through the appliance mounting base.

3. Apparatus as claimed in claim 1 wherein said wedge block further comprises a first circular opening of diameter larger than said post shoulder and a second circular opening of diameter smaller than said post shoulder, said openings joined together by an annular passage of increasing thickness from said first opening to said second opening to form said wedge incline.

4. Apparatus as claimed in claim 3, further comprising means for securing said wedge block in a position wherein said second circular opening is aligned with said shoulder, said means for securing being attached to said appliance mounting base.

5. Apparatus as claimed in claim 4 wherein said means for securing further comprises a key-operated latch which is movable to a locking position against said wedge block.

6. Apparatus as claimed in claim 5, further comprising means for sealing the perimeter of said mounting base against said surface.

7. An apparatus for removably attaching an alarm device to a vehicle surface, comprising:
    an insulated post attached to said surface and extending therethrough, said post having an axial passage passing therethrough, and an electrical conductor therein, said post having a circumferential groove forming a shoulder portion at a distance above said surface;
    a first base having a central hole larger than said post cross sectional area and seated over said post;
    a second base for fixedly mounting said alarm device, covering said first base and attached thereto, said second base having a perimeter for meeting said vehicle surface, and having an elevation higher than said first base, said second base having a downwardly extending insulated post with axially aligned internal conductor in alignment with said conductor in said surface-attached insulated post;
    a wedge block having a first internal hole larger than said surface-attached post cross sectional area and a second internal hole smaller than said area but larger than the area within said circumferential post groove, and having a passage interconnecting said internal holes of width equal to said second internal hole and thickness increasing from said larger to said smaller hole, said wedge block mounted over said surface-attached post and slidable over said first base surface;

means attached to said wedge block and extending outward from said second base, for slidably moving said wedge block over said first base surface.

8. Apparatus as claimed in claim 7, further comprising a spring-biased electrical contact recessed in said surface-attached post and a protruding male electrical contact connected to said conductor in said downwardly extending post.

9. Apparatus as claimed in claim 8, further comprising locking means attached to said second base for securing said means for slidably moving said wedge block.

10. Apparatus as claimed in claim 9, further comprising means for electrically connecting said alarm device to said conductor in said downwardly extending post.

* * * * *